(12) United States Patent
Chen

(10) Patent No.: US 6,827,497 B2
(45) Date of Patent: Dec. 7, 2004

(54) FREE-WHEEL HUB ASSEMBLY

(75) Inventor: Hubert Chen, Taichung (TW)

(73) Assignee: Kung Teng Industry Co., Ltd., Taichung Hsien (TW)

( * ) Notice: Subject to any disclaimer, the term of this patent is extended or adjusted under 35 U.S.C. 154(b) by 148 days.

(21) Appl. No.: 10/342,391

(22) Filed: Jan. 15, 2003

(65) Prior Publication Data

US 2003/0198419 A1 Oct. 23, 2003

Related U.S. Application Data

(63) Continuation-in-part of application No. 10/166,775, filed on Jun. 12, 2002.

(51) Int. Cl.[7] .......................... F16D 41/24; B60B 27/00
(52) U.S. Cl. .......................... 384/545; 192/64; 384/126
(58) Field of Search ................................ 384/545, 126; 192/64; 301/110.5

(56) References Cited

U.S. PATENT DOCUMENTS

| | | | | |
|---|---|---|---|---|
| 4,580,670 A | * | 4/1986 | Nagano | 192/64 |
| 6,260,681 B1 | * | 7/2001 | Chen | 384/545 |
| 6,386,644 B2 | * | 5/2002 | Chen | 192/64 |
| 6,497,314 B2 | * | 12/2002 | Kanehisa | 192/64 |

* cited by examiner

Primary Examiner—Thomas R. Hannon
(74) Attorney, Agent, or Firm—Foley & Lardner LLP

(57) ABSTRACT

A free-wheel hub assembly includes an axle extending through a hub and having an annular axle flange projecting radially and outwardly therefrom into a right recess defined by a right end of the hub. A self-lubricating bearing is slidably sleeved on the axle flange. A sprocket-mounting member is sleeved on the axle flange, and has an annular coupling end which extends into the right recess and which is in sliding contact with the self-lubricating bearing. An inner bearing is sleeved on the axle and abuts against one end of the axle flange. An outer bearing is sleeved on the axle and abuts against the other end of the axle flange. A ratchet unit is coupled to the sprocket-mounting member and the hub.

2 Claims, 3 Drawing Sheets

FREE-WHEEL HUB ASSEMBLY

CROSS-REFERENCE TO RELATED APPLICATION

This application is a Continuation-in-Part (CIP) of a co-pending U.S. patent application Ser. No. 10/166,775, filed by the applicant on Jun. 12, 2002.

BACKGROUND OF THE INVENTION

1. Field of the Invention

The present invention relates to a free-wheel hub assembly for a bicycle.

2. Description of the Related Art

Referring to FIG. 1, a conventional free-wheel hub assembly is shown to include: a tubular spoke-mounting hub 2 having bowl-shaped left and right ends respectively defining left and right recesses, each of which is confined by a recess-defining wall that has an inner recess portion and an outer recess portion; an axle 1 co-axially extending through the spoke-mounting hub 2 and having a right axle portion 100 disposed outwardly of the right end of the spoke-mounting hub 2; left and right inner bearings 201 sleeved on the axle 1 and disposed at the inner recess portions of the left and right recesses for rotatably mounting of the spoke-mounting hub 2 thereon; a tubular spacing sleeve 6 sleeved on the right axle portion 100 and disposed in the outer recess portion of the right recess; a sprocket-mounting member 3 having an annular coupling end 301 extending into the outer recess portion of the right recess in the spoke-mounting hub 2 and radially spaced apart from the tubular spacing sleeve 6 to define a gap "G" therebetween; left and right outer bearings 5 mounted around the right axle portion 100 to facilitate rotation of the sprocket-mounting member 3 on the axle 1; and a ratchet unit 4 disposed in the outer recess portion of the right recess and coupled to the coupling end 301 of the sprocket-mounting member 3 and the recess-defining wall of the right recess in the right end of the spoke-mounting hub 2 so as to permit co-rotation of the sprocket-mounting member 3 and the spoke-mounting hub 2.

One drawback of the aforementioned conventional free-wheel hub assembly resides in that the sprocket-mounting member 3 can move in a radial direction relative to the axle 1 due to the presence of the gap "G" which, in turn, can result in unstable mounting of the ratchet unit 4 in the outer recess portion of the right recess in the spoke-mounting hub 2.

SUMMARY OF THE INVENTION

Therefore, the object of this invention is to provide a free-wheel hub assembly which includes a self-lubricating bearing that fills the aforementioned gap in such a manner as to provide stable mounting of a ratchet unit in a right end of a spoke-mounting hub of the free-wheel hub assembly.

Accordingly, a free-wheel hub assembly of the present invention includes: a tubular spoke-mounting hub having a bowl-shaped right end defining a right recess that is confined by a recess-defining wall and that has an inner recess portion and an outer recess portion; an axle co-axially extending through the spoke-mounting hub and having a right axle portion that extends through the right recess, and that is formed with an annular axle flange projecting radially and outwardly therefrom into the outer recess portion of the right recess and having an inner end face transverse to an axis of the axle and an outer end face opposite to the inner end face; an inner bearing sleeved slidingly on the right axle portion of the axle, disposed in the inner recess portion of the right recess, and abutting against the inner end face of the annular axle flange; a self-lubricating bearing sleeved on the annular axle flange, and having an inner surface in sliding contact with the annular axle flange and an outer surface opposite to the inner surface; a tubular sprocket-mounting member having an annular coupling end that extends into the outer recess portion of the right recess, and that is sleeved on and that is in sliding contact with the outer surface of the self-lubricating bearing; a ratchet unit disposed in the outer recess portion of the right recess and coupled to the annular coupling end of sprocket-mounting member and the recess-defining wall so as to permit synchronous rotation of the sprocket-mounting member and the spoke-mounting hub in a forward direction; and an outer bearing sleeved on the right axle portion, disposed in the sprocket-mounting member, and abutting against the outer end face of the annular axle flange and the annular coupling end of the sprocket-mounting member so as to permit smooth and synchronous rotation of the spoke-mounting hub and the sprocket-mounting member on the axle.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
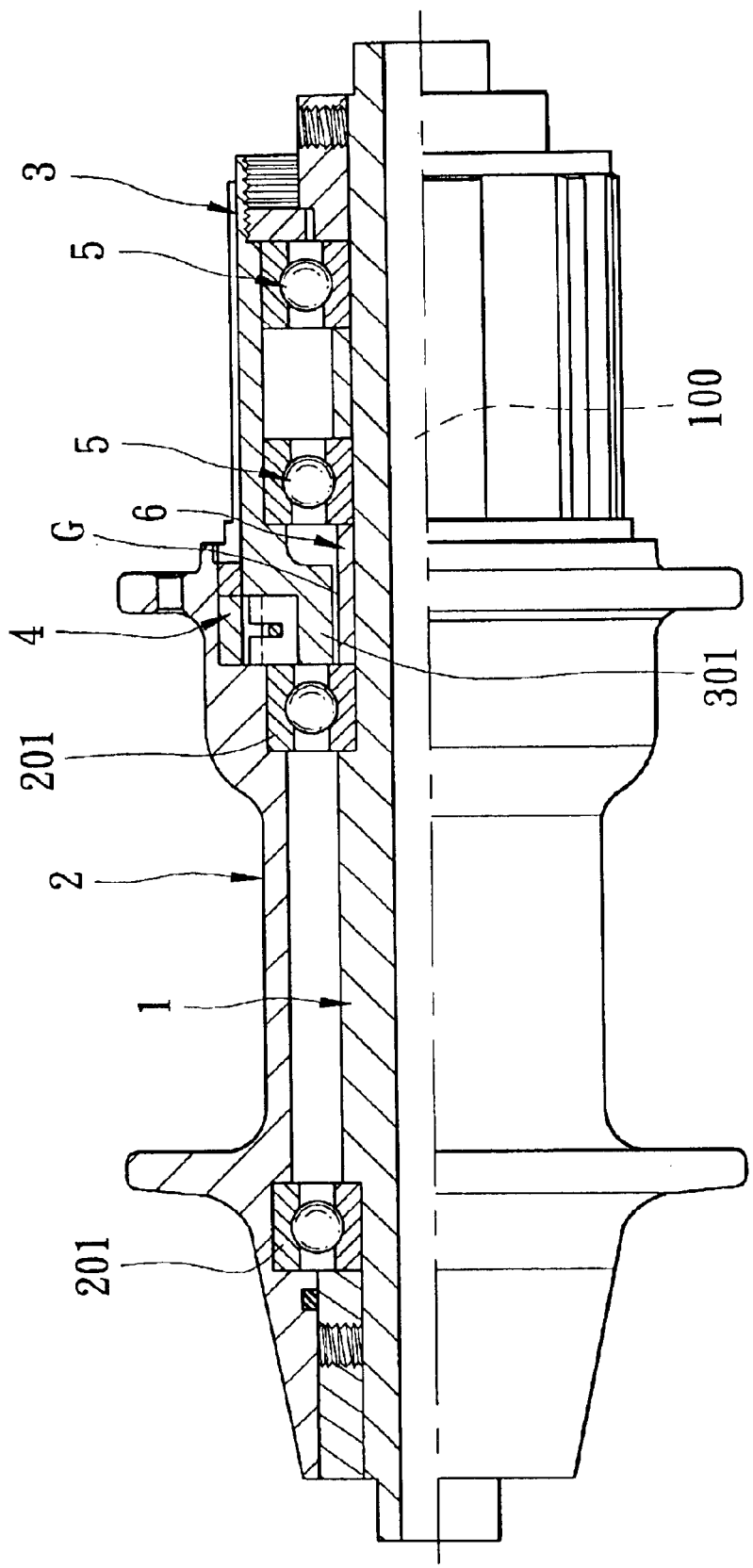
FIG. 1 is a partly sectional view of a conventional free-wheel hub assembly.
Figure 2:
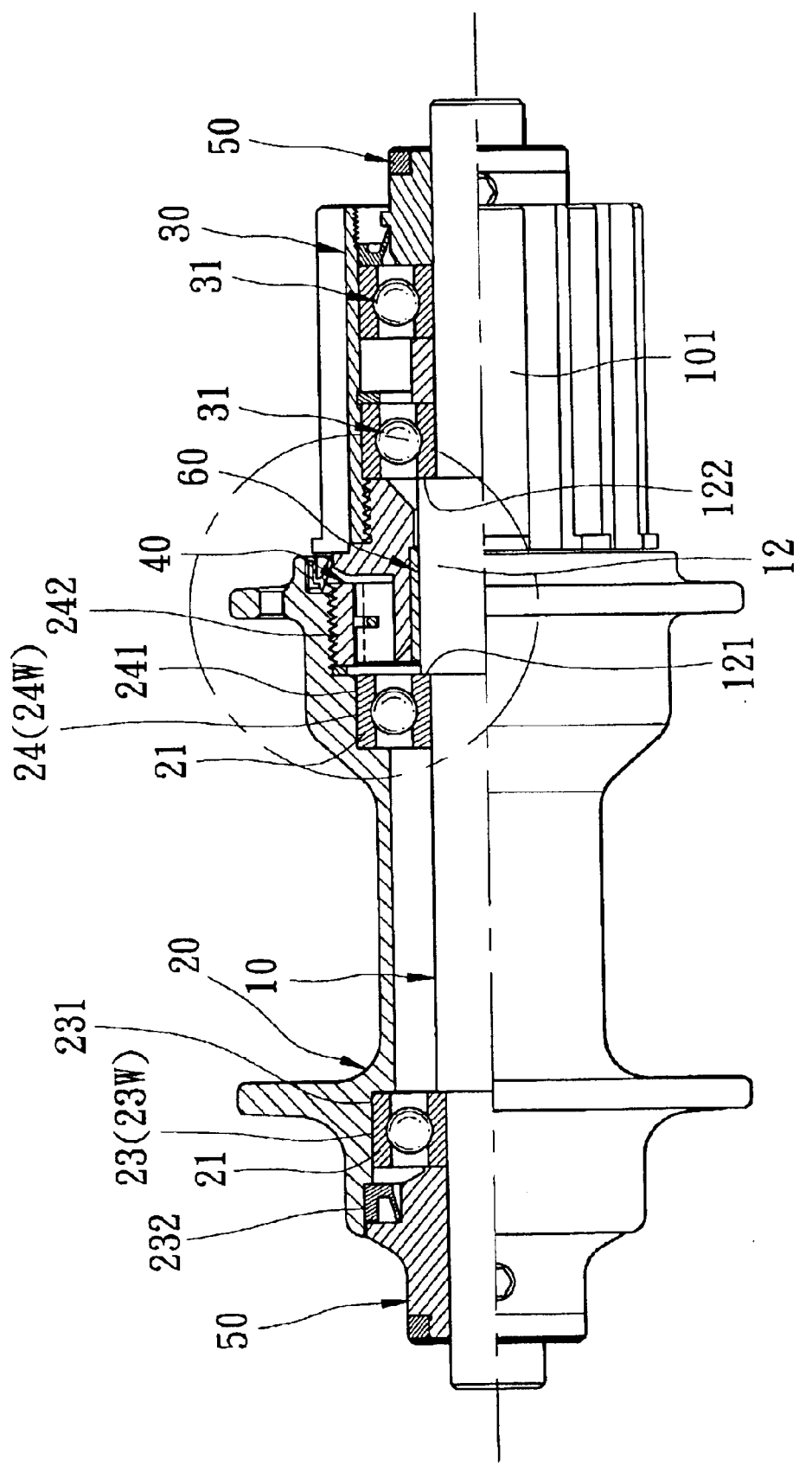
FIG. 2 is a partly sectional view of a preferred embodiment of a free-wheel hub assembly according to the present invention.
Figure 3:
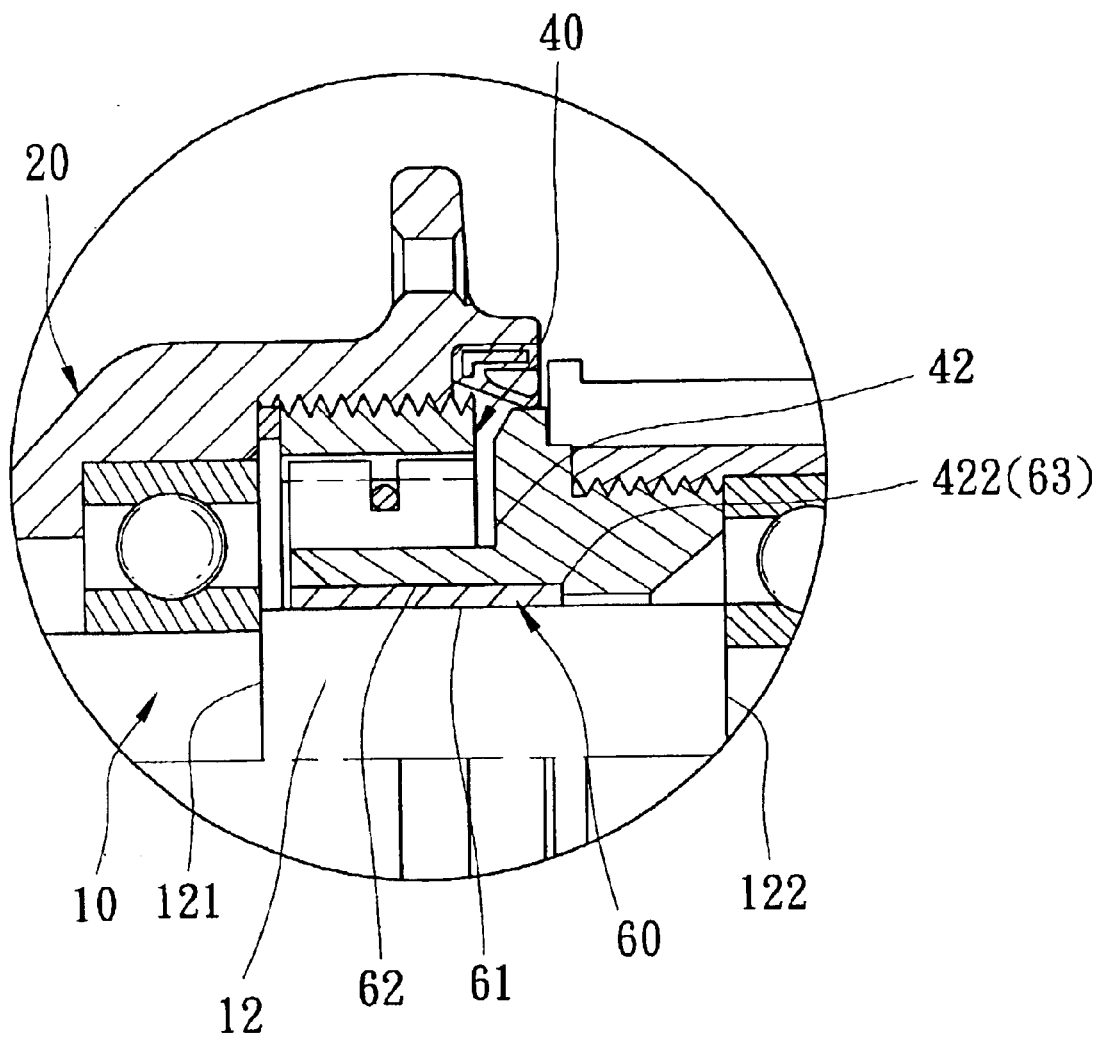
FIG. 3 is an enlarged view of a circled portion of the preferred embodiment shown in FIG. 2.

Referring to FIGS. 2 and 3, the preferred embodiment of a free-wheel hub assembly for a bicycle according to the present invention is shown to include a tubular spoke-mounting hub 20, an axle 10, left and right inner bearings 21, a self-lubricating bearing 60, a tubular sprocket-mounting member 30, a ratchet unit 40, and left and right outer bearings 31.

As illustrated, the tubular spoke-mounting hub 20 has bowl-shaped left and right ends respectively defining left and right recesses 23, 24 therein. Each of the left and right recess 23, 24 is confined by a recess-defining wall 23W, 24W, and has an inner recess portion 231, 241 and an outer recess portion 232, 242.

The axle 10 co-axially extends through the spoke-mounting hub 20, and has a right axle portion 101 that extends through the right recess 24, that is formed with an annular axle flange 12 projecting radially and outwardly therefrom into the outer recess portion 242 of the right recess 24 and having an inner end face 121 transverse to an axis of the axle 10 and an outer end face 122 opposite to the inner end face 121.

The left inner bearing 21 is disposed in the inner recess portion of the left recess 23. The right inner bearing 21 is sleeved on the right axle portion 101 for rotatably mounting of the spoke-mounting hub 20 thereon, is disposed in the inner recess portion 241 of the right recess 24, and abuts against the inner end face 121 of the annular axle flange 12.

The self-lubricating bearing 60 is sleeved on the annular axle flange 12, and has an inner surface 61 in sliding contact with the annular axle flange 12, and an outer surface 62 opposite to the inner surface 61.

The sprocket-mounting member 30 has an annular coupling end 42 that extends into the outer recess portion 242 of the right recess 24 in the spoke-mounting hub 20, and that is sleeved on and that is in sliding contact with the outer surface 62 of the self-lubricating bearing 60. The sprocket-mounting member 30 further has a sprocket-mounting end opposite to the coupling end 42 and disposed outwardly of the right recess 24 around the right axle portion 101 of the axle 10.

The ratchet unit 40 is disposed in the outer recess portion 242 of the right recess 24 around the coupling end 42 of the sprocket-mounting member 30, and is coupled to the coupling end 42 of the sprocket-mounting member 30 and the recess-defining wall 24W of the right recess 24 in the right end of the spoke-mounting hub 20 so as to permit co-rotation of the sprocket-mounting member 30 and the spoke-mounting hub 20 when the bicycle is pedaled in a forward direction (not shown).

The left and right outer bearings 31 are sleeved on the right axle portion 101, and are disposed in the sprocket-mounting member 30 in such a manner that the left and right outer bearings 31 are in sliding contact with the sprocket-mounting end of the sprocket-mounting member 30 and that the left outer bearing 31 abuts against the outer end face 122 of the annular axle flange 12 and the annular coupling end 42 of the sprocket-mounting member 30 so as to permit smooth and synchronous rotation of the spoke-mounting hub 20 and the sprocket-mounting member 30 on the axle 10.

A left bearing retention nut 50 is threadedly mounted on a left axle portion the axle 10, and extends into the outer recess portion 232 of the left recess 23 in the spoke-mounting hub 20 to prevent disengagement of the left inner bearing 21 from the spoke-mounting hub 20. A right bearing retention nut 50 is mounted threadedly on the right axle portion 101, and extends into the sprocket-mounting end of the sprocket-mounting member 30 so as to prevent disengagement of the right outer bearing 31 from the sprocket-mounting end of the sprocket-mounting member 30.

In this preferred embodiment, the annular coupling end 42 of the sprocket-mounting member 30 is formed with a retention flange 422 that projects inwardly and radially therefrom toward the annular axle flange 12 and that abuts against an outer end 63 of the self-lubricating bearing 60 so as to prevent axial movement of the self-lubricating bearing 60 on the annular axle flange 12, thereby enhancing positioning of the self-lubricating bearing 60 on the annular axle flange 12.

With the inclusion of the annular axle flange 12 and the self-lubricating bearing 60 in the hub assembly of the present invention, the drawback as encountered in the prior art can be eliminated.

With this invention thus explained, it is apparent that numerous modifications and variations can be made without departing from the scope and spirit of this invention. It is therefore intended that the invention be limited only as indicated in the appended claims.

I claim:

1. A free-wheel hub assembly characterized by:

a tubular spoke-mounting hub having a bowl-shaped right end defining a right recess that is confined by a recess-defining wall and that has an inner recess portion and an outer recess portion;

an axle co-axially extending through said spoke-mounting hub and having a right axle portion that extends through said right recess, and that is formed with an annular axle flange projecting radially and outwardly therefrom into said outer recess portion of said right recess and having an inner end face transverse to an axis of said axle and an outer end face opposite to said inner end face;

an inner bearing sleeved slidingly on said right axle portion of said axle, disposed in said inner recess portion of said right recess, and abutting against said inner end face of said annular axle flange;

a self-lubricating bearing sleeved on said annular axle flange, and having an inner surface in sliding contact with said annular axle flange and an outer surface opposite to said inner surface;

a tubular sprocket-mounting member having an annular coupling end that extends into said outer recess portion of said right recess, and that is sleeved on and that is in sliding contact with said outer surface of said self-lubricating bearing;

a ratchet unit disposed in said outer recess portion of said right recess and coupled to said annular coupling end of said sprocket-mounting member and said recess-defining wall so as to permit synchronous rotation of said sprocket-mounting member and said spoke-mounting hub in a forward direction; and at least an outer bearing sleeved on said right axle portion, disposed in said sprocket-mounting member, and abutting against said outer end face of said annular axle flange and said annular coupling end of said sprocket-mounting member so as to permit smooth and synchronous rotation of said spoke-mounting hub and said sprocket-mounting member on said axle.

2. The free-wheel hub assembly as defined in claim 1, wherein said annular coupling end of said sprocket-mounting member is formed with a retention flange that projects inwardly and radially therefrom toward said annular axle flange and that abuts against an outer end of said self-lubricating bearing so as to enhance positioning of said self-lubricating bearing on said annular axle flange.

* * * * *